United States Patent [19]
Kupfer et al.

[11] 3,728,455
[45] Apr. 17, 1973

[54] NOVEL COMPOSITIONS OF MATTER

[75] Inventors: David Kupfer, Pearl River, N.Y.; Henry George Roscoe, Montvale, N.J.; Donald Arthur Blickens, Suffern, N.Y.

[73] Assignee: American Cyanamid Company, Stamford, Conn.

[22] Filed: June 24, 1971

[21] Appl. No.: 156,512

[52] U.S. Cl. ................................................. 424/270
[51] Int. Cl. ............................................. A61k 27/00
[58] Field of Search .................... 424/270; 260/302 S

[56] References Cited

UNITED STATES PATENTS 2,392,935  1/1946  Mathes ............................. 260/302 S
3,592,904  7/1971  Evans ................................. 424/270

OTHER PUBLICATIONS

Chem. Abst. Vol. 60, p. 4,122–4,123 (1964).

*Primary Examiner*—Stanley J. Friedman
*Attorney*—Edward A. Conroy, Jr.

[57] ABSTRACT

This disclosure describes compositions of matter useful for inhibiting the formation of histamine in mammals and the method of inhibiting histamine formation in mammals therewith, the active ingredients of said compositions of matter being certain substituted 4-phenyl-2-mercaptothiazoles.

5 Claims, No Drawings

NOVEL COMPOSITIONS OF MATTER

BRIEF SUMMARY OF THE INVENTION

This invention relates to novel compositions of matter useful for inhibiting the formation of histamine in mannals. More particularly, it relates to therapeutic compositions containing certain substituted 4-phenyl-2-mercaptothiazoles which inhibit histamine formation in mammals. The invention includes the new compositions of matter and the method of inhibiting histamine formation in mammals therewith.

Our invention is based upon the discovery that certain substituted 4-phenyl-2-mercaptothiazoles are potent inhibitors of the enzyme histidine decarboxylase with resultant inhibition of histamine formation in mammals. The mode of action of the active compounds of the present invention thus differs from that of known antihistaminic compounds which ordinarily merely counteract the existing released or formed histamine. The substituted 4-phenyl-2-mercaptothiazoles of the present invention may be represented by the following general formula:

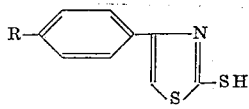

wherein R is hydrogen, fluoro or lower alkanoylamino. Suitable lower alkanoylamino groups contemplated by the present invention are those having up to four carbon atoms such as, for example, formylamino, acetylamino, propionylamino, isobutyrylamino, etc.

The decarboxylation of histidine by the specific enzyme histidine decarboxylase results in the formation of histamine in mammals. It is well established that histamine is implicated in a number of physiological functions including, for example, the nervous system, peripheral circulation, gastric hyperacidity, and allergic manifestations such as hay fever. The novel compositions of the present invention are thus also useful as gastric acid secretion inhibitors and therefore are of interest as potential anti-ulcer agents.

DETAILED DESCRIPTION OF THE INVENTION

The substituted 4-phenyl-2-mercaptothiazoles of the present invention form non-toxic acid-addition salts with a variety of pharmaceutically acceptable organic and inorganic salt-forming reagents. Thus, acid-addition salts, formed by admixture of the 4-phenyl-2-mercaptothiazole base with an equivalent of an acid, suitably in a neutral solvent, are formed with such acids as sulfuric, phosphoric, hydrochloric, hydrobromic, citric, lactic, tartaric, acetic and related acids. For purposes of this invention, the substituted 4-phenyl-2-mercaptothiazoles are equivalent to their non-toxic acid-addition salts.

The effectiveness of the active compounds of the present invention in inhibiting the activity of the enzyme histidine decarboxylase was determined as follows. The compounds were tested for their ability to inhibit fetal histidine decarboxylase. Specific fetal histidine decarboxylase was prepared from whole fetal rats (17–19 days gestation) according to the method of Håkanson, Biochemical Pharmacology 12, 1289 (1963) except that the fetuses were homogenized in 0.1M acetate buffer, pH 5.5 as described by Levine and Watts, Biochemical Pharmacology 15, 841 (1966). Supernatant II fraction was used. Histidine decarboxylase activity was assayed essentially as described by Ellenbogen et al., Biochemical Pharmacology 18, 683 (1969). A 5.0 mg. portion of each inhibitor was dissolved in 0.6 ml. of dimethylformamide and 1.4 ml. of deionized water was added. After mixing, 0.05 ml. of the solution or emulsion was added to the reaction tube, producing a final inhibitor concentration of 0.0625 mg./ml. The results of this in vitro test with typical compounds of the present invention are shown in Table I below.

TABLE I

| Compound | Percent Inhibition |
|---|---|
| 4-(p-fluorophenyl)-2-mercaptothiazole | 19.4 |
| 4-(p-acetylaminophenyl)-2-mercaptothiazole | 19.5 |
| 4-phenyl-2-mercaptothiazole | 42.4 |

The active compounds of the present invention and their non-toxic pharmaceutically acceptable acid-addition salts have thus been found to be highly useful for inhibiting the activity of histidine decarboxylase in mammals when administered in amounts ranging from about 10 mg. to about 100 mg. per kg. of body weight per day. A preferred dosage regimen for otpimum results would be from about 10 mg. to about 50 mg. per kg. of body weight per day, and such dosage units are employed that a total of from about 700 mg. to about 3.5 gm. of active ingredient for a subject of about 70 kg. body weight are administered in a 24 hour period. The compounds of the present invention may be administered by any convenient route such as orally, intraperitoneally, subcutaneously, intramuscularly or intravenously.

Compositions according to the present invention having the desired clarity, stability and adaptability for parenteral use are obtained by dissolving from 0.10 percent to 10.0 percent by weight of active compound in a vehicle consisting of a polyhydric aliphatic alcohol or mixtures thereof. Especially satisfactory are glycerin, propylene glycol and the polyethylene glycols. The polyethylene glycols consist of a mixture of nonvolatile, normally liquid, polyethylene glycols which are soluble in both water and organic liquids and which have molecular weights of from about 200 to about 1,500. Although the amount of active compound dissolved in the above vehicle may vary from 0.10 percent to 10.0 percent by weight, it is preferred that the amount of active compound employed be from about 3.0 percent to about 9.0 percent by weight. Although various mixtures of the aformentioned non-volatile polyethylene glycols may be employed, it is preferred to use a mixture having an average molecular weight of from about 200 to about 400.

In addition to the active compounds, the parenteral solutions may also contain various preseveratives which may be used to prevent bacterial and fungal contamination. The preservatives which may be used for such purpose are, for example, myristyl-gamma-picolinium chloride, phenyl mercuric nitrate, benzalkonium chloride, phenethyl alcohol, p-chlorophenyl-α-gly-cerol ether, methyl and propyl parabens, and thimerosal. As a practical matter it is also convenient to employ antioxidants. Suitable antioxidants include, for example, sodium bisulfite, sodium metabisulfite, and sodium formaldehyde sulfoxylate. Generally, from about 0.05 percent to about 0.2 percent concentrations of antioxidant are employed.

For intramuscular injection, the preferred concentration of active compound is 25 to 50 mg./ml. of the finished compositions. They are equally adapted to intravenous administration when diluted with water or diluents employed in intravenous therapy such as isotonic glucose in appropriate quantities. For intravenous use, initial concentrations down to about 10 to 25 mg./ml. of active compound are satisfactory. They are also adapted to oral administration when diluted with drinking water.

The active compounds of the present invention may be orally administered, for example, with an inert diluent or with an assimilable edible carrier, or they may be enclosed in hard or soft shell gelatin capsules, or they may be compressed into tables, or they may be incorporated directly with the food of the diet. For oral therapeutic administration, the compounds may be incorporated with excipients and used in the form of tablets, troches, capsules, elixirs, suspensions, syrups, wafers, and the like. Such compositions and preparations should contain at least 0.1 percent of active compound. The percentage in the compositions and preparations may, of course, be varied and may conveniently be between about 5 percent to about 75 percent or more of the weight of the unit. The amount of active ingredient in such therapeutically useful compositions is such that a suitable dosage will be obtained. Preferred compositions or preparations according to the present invention are prepared so that an oral dosage unit form contains between about 10 and 200 milligrams of active compound.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain, in addition to materials of the above type, a liquid carrier such as a fatty oil. Various other materials may be present as coatings or to otherwise modify the physical form of the dosage unit. For instance, tablets, pills or capsules may be coated with shellac, sugar or both. A syrup or elixir may contain the active compounds, sucrose as a sweetening agent, methyl and propylparabens as preservatives, a dye and flavoring such as cherry or orange flavor. Of course, any material used in preparing any dosage unit form should be pharmaceutically pure and substantially non-toxic in the amounts employed.

The invention will be described in greater detail in conjunction with the following specific examples.

EXAMPLE 1

Preparation of 4-(p-fluorophenyl)-2-mercaptothiazole

This compound may be prepared as described by Runge et al. in Journal Praktische Chemie 4(21), 39 (1963).

EXAMPLE 2

Preparation of 4-(p-acetylaminophenyl)-2-mercaptothiazole

A 37.0 g. (0.175 mole) portion of p-chloroacetyl acetanilide was mixed with 300 ml. of absolute ethanol. This partially dissolved mixture was added to 28.6 g. of dithioammonium carbamide suspended in 100 ml. of absolute ethanol. The mixture was shaken vigorously and allowed to stand at room temperature with intermittent shaking. A yellow crystalline solid appeared which was collected by filtration, washed twice with 50 ml. portions of ethanol followed by two 100 ml. portions of water and then dried at room temperature. The yield was 32.0 g. of product, m.p. 242°–262°C. (decomposition).

EXAMPLE 3

Preparation of 4-(p-formylaminophenyl)-2-mercaptothiazole

By replacing the p-chloroacetyl acetanilide employed in Example 2 with an equimolecular quantity of p-chloroacethyl formanilide and following substantially the same precedure described in Example 2, there is obtained the 4-(p-formylaminophenyl)-2-mercaptothiazole.

EXAMPLE 4

Preparation of 4-(p-propionylaminophenyl)-2-mercaptothiazole

The procedure of Example 2 is repeated, substituting an equimolecular amount of p-chloroacetyl propionanilide for the p-chloroacetyl acetanilide employed in that example. There is thus obtained the 4-(p-propionylaminophenyl)-2-mercaptothiazole.

EXAMPLE 5

Preparation of 4-(p-isobutyrylaminophenyl)-2-mercaptothiazole

In place of the p-chloroacetyl acetanilide of Example 2, there is employed an equimolecular quantity of p-chloroacetyl isobutyranilide whereby the 4-(p-isobutyrylaminophenyl)- 2-mercaptothiazole is obtained in equally good yield.

EXAMPLE 6

Preparation of 4-phenyl-2-mercaptothiazole

This compound may be prepared as described by W. S. Emerson and T. M. Patrick in the Journal of Organic Chemistry 13, 722 (1948).

EXAMPLE 7

Preparation of capsule formulation

| Ingredient | Milligrams per Capsule |
|---|---|
| 4[p-(n-butyrylamino)phenyl]-2 | |

-mercaptothiazole 100
Starch 80
Magnesium stearate 5

The active ingredient, starch and magnesium stearate are blended together. The mixture is used to fill hard shell capsules of a suitable size at a fill weight of 185 milligrams per capsule.

EXAMPLE 8

Preparation of tablet formulation

| Ingredient | Milligrams per Capsule |
|---|---|
| 4-(p-formylaminophenyl)-2-mercaptothiazole | 100 |
| Lactose | 200 |
| Corn Starach (for mix) | 50 |
| Corn Starch (for paste) | 50 |
| Magnesium stearate | 6 |

The active ingredient, lactose and corn starch (for mix) are blended together. The corn starch (for paste) is suspended in water at a ratio of 10 grams of corn starch per 80 milliliters of water and heated with stirring to form a paste. This paste is then used to granulate the mixed powders. The wet granules are passed through a No. 8 screen and dried at 120°F. The dry granules are passed through a No. 16 screen. The mixture is lubricated with magnesium stearate and compressed into tablets in a suitable tableting machine. Each tablet contains 100 milligrams of active ingredient.

EXAMPLE 9

Preparation of oral syrup formulation

| Ingredient | Amount |
|---|---|
| 4-(p-fluorophenyl)-2-mercaptothiazole | 500 mg. |
| Sorbitol solution (70% N.F.) | 40 ml. |
| Sodium benzoate | 150 mg. |
| Sucaryl | 90 mg. |
| Saccharin | 10 mg. |
| Red Dye (F.D. & C. No. 2) | 10 mg. |
| Cherry flavor | 50 mg. |
| Distilled water       gs to | 100 ml. |

The sorbitol solution is added to 40 milliliters of distilled water and the active ingredient is suspended therein. The sucaryl, saccharin, sodium benzoate, flavor and dye are added and dissolved in the above solution. The volume is adjusted to 100 milliliters with distilled water.

Other ingredients may replace those listed in the above formulation. For example, a suspending agent such as bentonite magma, tragacanth, carboxymethylcellulose, or methylcellulose may be used. Phosphates, citrates or tartrates may be added as buffers. Preservatives may include the parabens, sorbic acid and the like and other flavors and dyes may be used in place of those listed above.

EXAMPLE 10

Preparation of intramuscular formulation

| Ingredient | Amount |
|---|---|
| 4-phenyl-2-mercaptothiazole | 2.5% |
| Parabens (4:1 mixture of methyl and propyl) | 0.1% |
| Water for injection | 100% |

The parabens are dissolved in about one-half the volume of water for injection at 80°C. with stirring. The solution is cooled to below 40°C. and the active ingredient is dissolved therein. The cooled solution is adjusted to final volume with water for injection and is then sterilized by sterile filtration through a suitable filter.

We claim:

1. The method of inhibiting the activity of the enzyme histidine decarboxylase in a mammal which comprises administering internally to said mammal an effective amount of a compound selected from the group consisting of the formula:

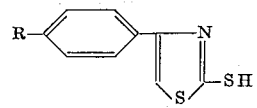

wherein R is selected from the group consisting of hydrogen, fluoro and lower alkanoylamino and a pharmacologically acceptable acid-addition salt thereof; in association with a pharmaceutical carrier to provide a daily dosage of from about 10 mg. to about 100 mg. per kilogram of body weight of said mammal.

2. The method according to claim 1 wherein R is hydrogen.

3. The method according to claim 1 wherein R is fluoro.

4. The method according to claim 1 wherein R is acetylamino.

5. The method according to claim 1 wherein R is propionylamino.

* * * * *